US 10,848,032 B2

(12) United States Patent
Doan et al.

(10) Patent No.: US 10,848,032 B2
(45) Date of Patent: Nov. 24, 2020

(54) POWER TOOL

(71) Applicant: MAKITA CORPORATION, Anjo (JP)

(72) Inventors: Toan Van Doan, Anjo (JP); Motohiro Omura, Anjo (JP); Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 248 days.

(21) Appl. No.: 15/874,421

(22) Filed: Jan. 18, 2018

(65) Prior Publication Data
US 2018/0241281 A1 Aug. 23, 2018

(30) Foreign Application Priority Data

Feb. 20, 2017 (JP) .................. 2017-029259

(51) Int. Cl.
*H02K 7/08* (2006.01)
*H02K 7/14* (2006.01)
(Continued)

(52) U.S. Cl.
CPC ........... *H02K 7/083* (2013.01); *B25D 16/003* (2013.01); *B25D 16/006* (2013.01); *B25D 17/00* (2013.01); *B25F 5/00* (2013.01); *B25F 5/008* (2013.01); *B25F 5/02* (2013.01); *H02K 3/522* (2013.01); *H02K 5/161* (2013.01); *H02K 7/14* (2013.01); *H02K 7/145* (2013.01); *H02K 11/215* (2016.01); *H02K 21/145* (2013.01); *B25D 2211/003* (2013.01); *B25D 2211/061* (2013.01); *B25D 2216/0015* (2013.01);
(Continued)

(58) Field of Classification Search
CPC .......... H02K 21/14; H02K 11/21; H02K 5/10; H02K 7/06
USPC ... 310/40 MM, 50, 68 B, 71, 156.05, 156.06
See application file for complete search history.

(56) References Cited

U.S. PATENT DOCUMENTS 6,121,700 A * 9/2000 Yamaguchi .......... H02K 5/1675
310/425
2006/0169061 A1* 8/2006 Seffernick .............. H02K 29/08
73/862.331
(Continued)

FOREIGN PATENT DOCUMENTS

CN 101401280 A 4/2009
CN 104170240 A 11/2014
(Continued)

OTHER PUBLICATIONS

Machine Translation JP11098770 (Year: 1999).*
Machine Translation JP2007007032 (Year: 2007).*
Jul. 30, 2020 Office Action issued in Chinese Patent Application No. 201810123389.7.

*Primary Examiner* — Jose A Gonzalez Quinones
(74) *Attorney, Agent, or Firm* — Oliff PLC

(57) ABSTRACT

A power tool including a brushless motor having a sensor circuit board has higher durability. The power tool includes a housing, a brushless motor including a rotor having a rotational shaft, a stator, and a sensor circuit board fixed to the stator and having a rotation detecting element that detects rotation of the rotor, and receiving the rotational shaft through the sensor circuit board, and a bearing held in the housing and supporting the rotational shaft. The bearing is located to overlap the rotation detecting element in an axial direction of the rotational shaft.

10 Claims, 9 Drawing Sheets

(51) Int. Cl.
    *H02K 11/215*      (2016.01)
    *H02K 5/16*      (2006.01)
    *H02K 21/14*      (2006.01)
    *B25F 5/00*      (2006.01)
    *H02K 3/52*      (2006.01)
    *B25D 17/00*      (2006.01)
    *B25D 16/00*      (2006.01)
    *B25F 5/02*      (2006.01)

(52) U.S. Cl.
    CPC ............... *B25D 2216/0023* (2013.01); *B25D 2216/0038* (2013.01); *B25D 2216/0084* (2013.01); *B25D 2250/095* (2013.01); *B25D 2250/221* (2013.01); *B25D 2250/265* (2013.01); *B25D 2250/331* (2013.01); *H02K 2211/03* (2013.01)

(56) References Cited

U.S. PATENT DOCUMENTS

| | | | | |
|---|---|---|---|---|
| 2009/0261693 A1* | 10/2009 | Debraillly | ............... | H02K 29/08 310/68 B |
| 2015/0022125 A1* | 1/2015 | Takano | ................... | B25F 5/008 318/139 |
| 2016/0380510 A1 | 12/2016 | Niwa | | |

FOREIGN PATENT DOCUMENTS

| | | | | |
|---|---|---|---|---|
| CN | 205017139 U | | 2/2016 | |
| JP | 11098770 A | * | 4/1999 | ............. H02K 11/01 |
| JP | 2007007032 A | * | 1/2007 | |
| JP | 2017-007068 A | | 1/2017 | |
| JP | 2017007032 A | * | 1/2017 | ............. H02K 15/00 |

\* cited by examiner

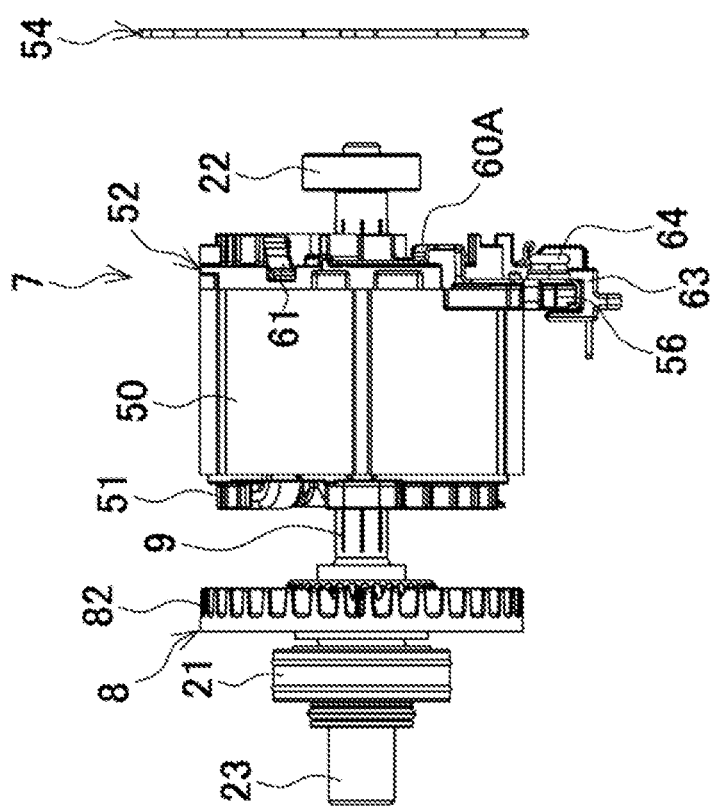
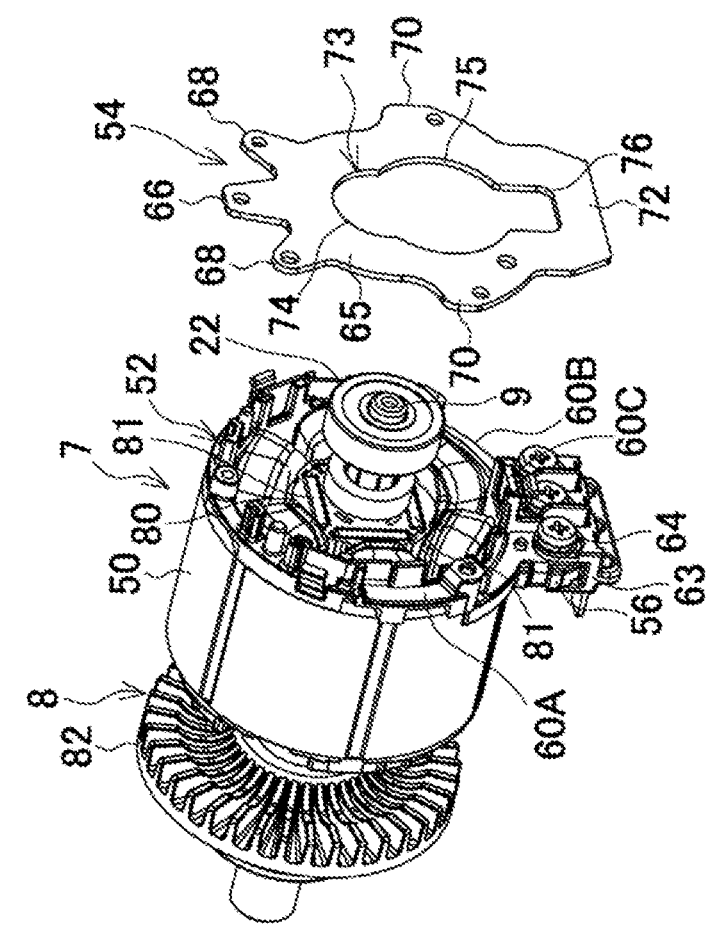
FIG. 5A
FIG. 5B

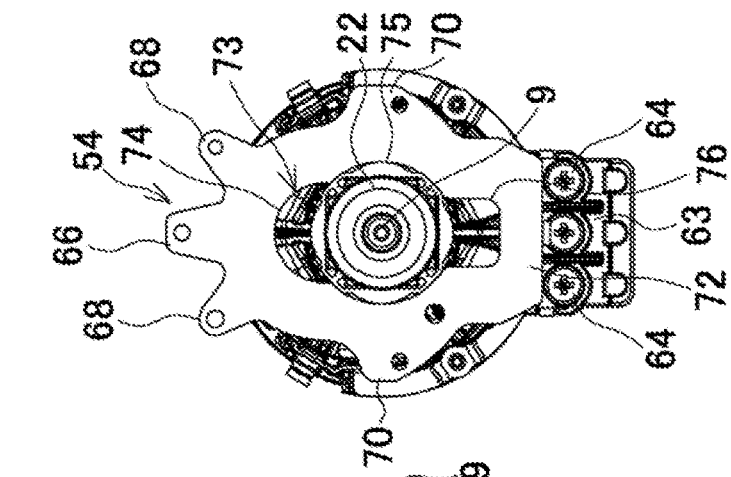
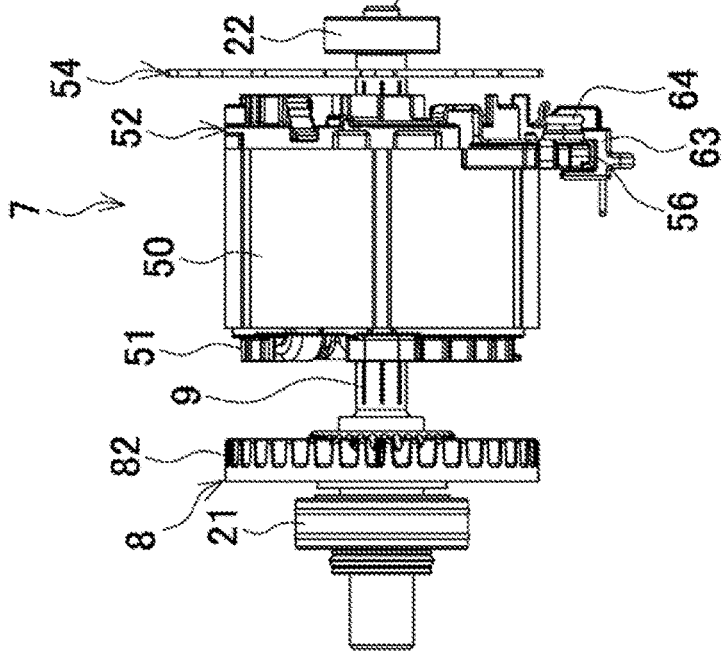
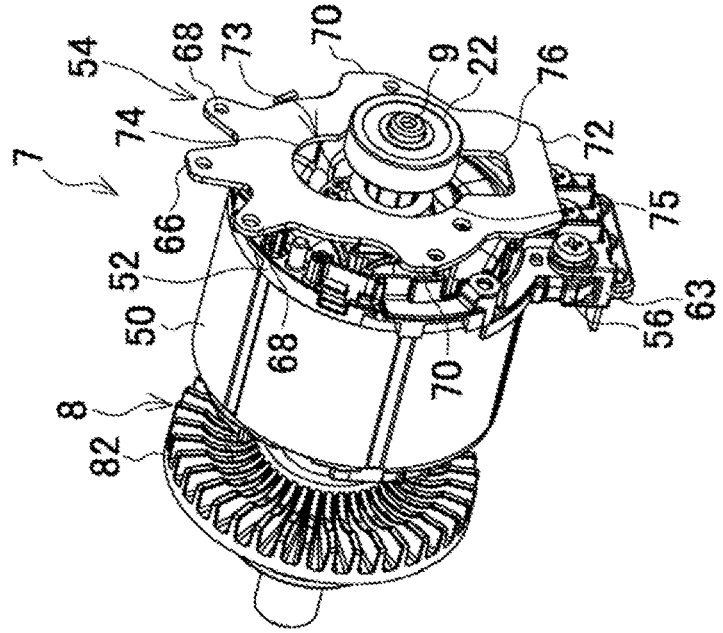

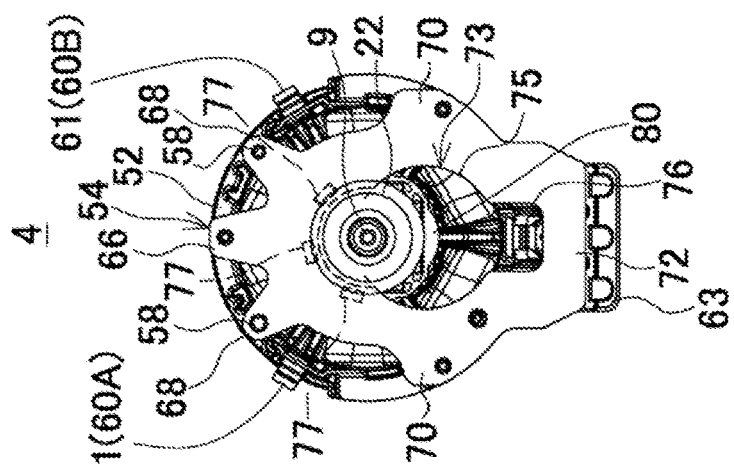
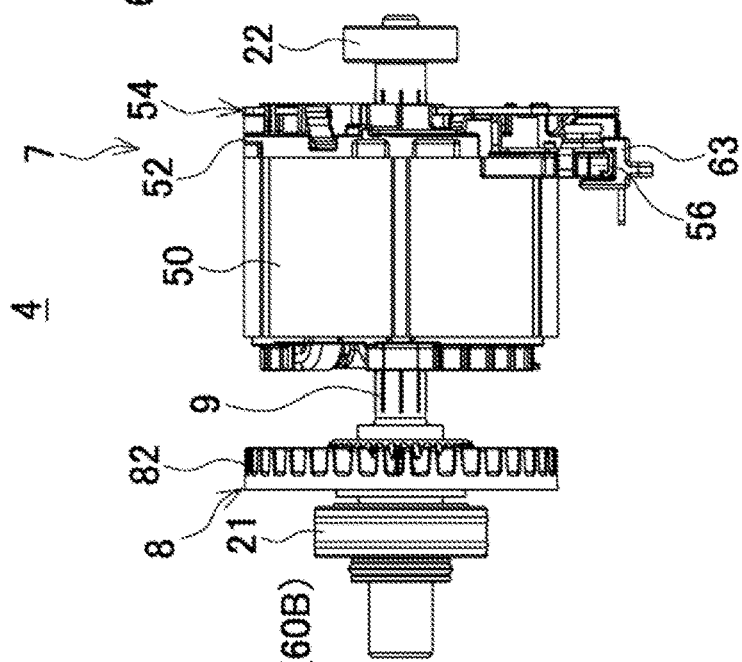
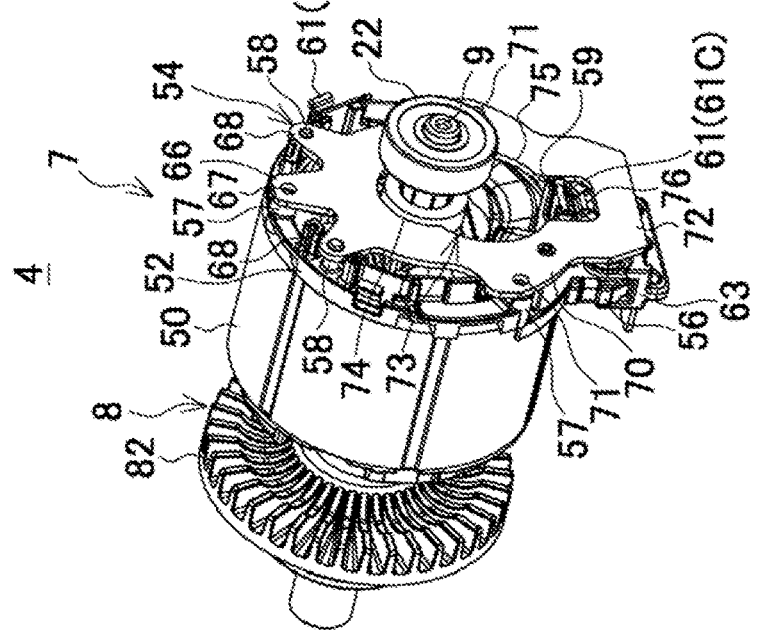

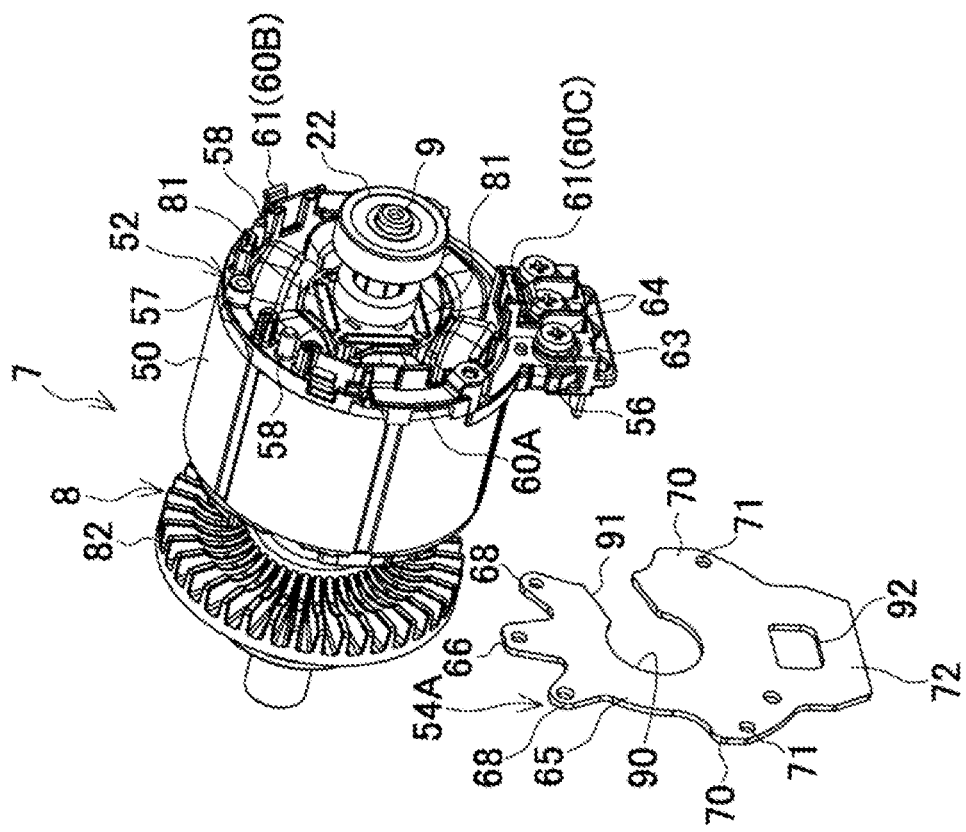
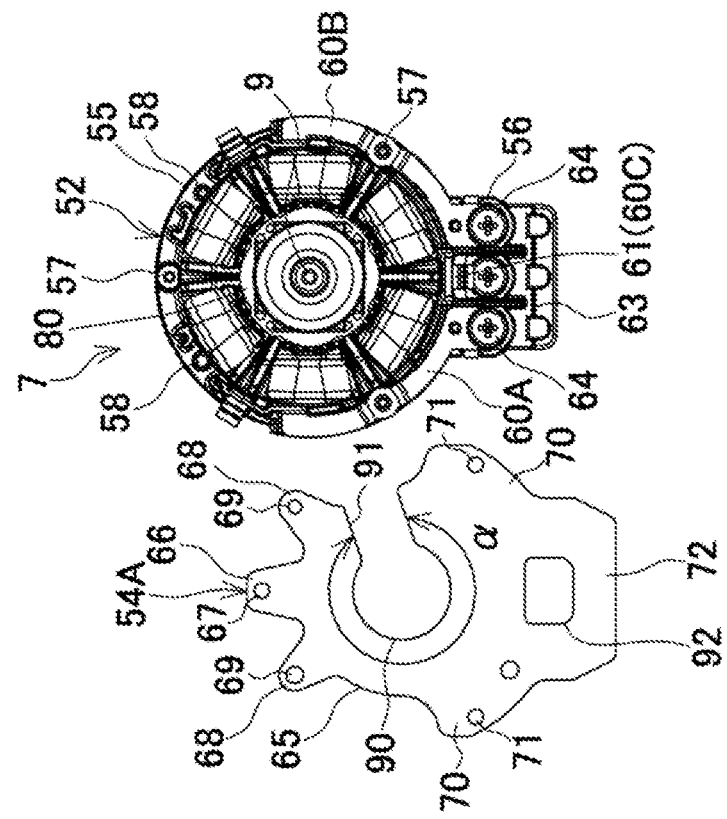

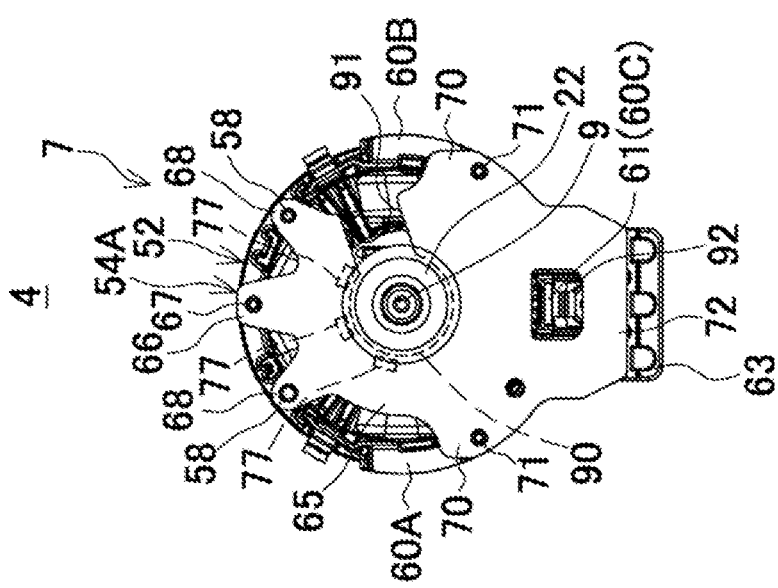

POWER TOOL

CROSS-REFERENCE TO RELATED APPLICATIONS

This application claims the benefit of priority to Japanese Patent Application No. 2017-029259, filed on Feb. 20, 2017, the entire contents of which are hereby incorporated by reference.

BACKGROUND

1. Technical Field

The present invention relates to a power tool such as a hammer drill driven by a brushless motor.

2. Description of the Background

Power tools such as a hammer drill driven by a brushless motor are known. A brushless motor, as described in Japanese Unexamined Patent Application Publication No. 2017-7068, includes a stator having coils, a rotor having a rotational shaft, and a sensor circuit board mounted on the stator and having three magnetic sensors (rotation detecting elements such as Hall elements). The magnetic sensors detect the position of a permanent magnet included in the rotor, and output a detection signal. A controller determines the rotational position of the rotor based on the detection signal from the magnetic sensors, and energizes the stator coils sequentially through switching elements to rotate the rotor.

To assemble the brushless motor for a power tool, the rotor is installed with the sensor circuit board mounted on the stator. The sensor circuit board has a central through-hole, through which the rotational shaft of the rotor and its bearing can pass inside the magnetic sensors. The bearing for receiving the rotational shaft thus cannot have a larger diameter than the through-hole in the sensor circuit board. This limits the bearing life, and lowers the durability of the power tool.

BRIEF SUMMARY

One or more aspects of the present invention are directed to improving the durability of a power tool including a brushless motor having a sensor circuit board.

A first aspect of the present disclosure provides a power tool, including:
  a housing;
  a brushless motor including
    a rotor having a rotational shaft,
    a stator, and
    a sensor circuit board fixed to the stator and having a rotation detecting element configured to detect rotation of the rotor, and receiving the rotational shaft therethrough; and
  a bearing held in the housing and supporting the rotational shaft, the bearing being located to overlap the rotation detecting element in an axial direction of the rotational shaft.

A second aspect of the present disclosure provides a power tool including;
  a housing;
  a brushless motor including
    a rotor having a rotational shaft,
    a stator, and
    a sensor circuit board fixed to the stator and having a rotation detecting element configured to detect rotation of the rotor; and
  a bearing held in the housing and supporting the rotational shaft,
  wherein the sensor circuit board includes a hole having a radius greater than a distance from a center of the rotational shaft to the rotation detecting element.

A third aspect of the present disclosure provides a power tool, including:
  a housing;
  a brushless motor including
    a rotor having a rotational shaft,
    a stator, and
    a sensor circuit board fixed to the stator and having a rotation detecting element configured to detect rotation of the rotor, and receiving the rotational shaft therethrough; and
  a bearing held in the housing and supporting the rotational shaft,
  wherein the sensor circuit board includes
    a through-hole through which the rotational shaft extends, having a smaller diameter than the bearing, and having a periphery at which the rotation detecting element is located, and
    an opening radially extending from the through-hole and larger than a diameter of the rotational shaft.

A fourth aspect of the present disclosure provides a brushless motor, including:
  a rotor having a rotational shaft;
  a stator;
  a sensor circuit board fixed to the stator and having a rotation detecting element configured to detect rotation of the rotor, and receiving the rotational shaft therethrough; and
  a bearing supporting the rotational shaft, the bearing being located to overlap the rotation detecting element in an axial direction of the rotational shaft.

A fifth aspect of the present disclosure provides a brushless motor, including:
  a rotor having a rotational shaft;
  a stator;
  a sensor circuit board fixed to the stator and having a rotation detecting element configured to detect rotation of the rotor, and receiving the rotational shaft therethrough; and
  a bearing supporting the rotational shaft,
  wherein the sensor circuit board includes a hole having a radius greater than a distance from a center of the rotational shaft to the rotation detecting element.

A sixth aspect of the present disclosure provides a brushless motor, including:
  a rotor having a rotational shaft;
  a stator;
  a sensor circuit board fixed to the stator and having a rotation detecting element for detecting the rotation of the rotor, and receiving the rotational shaft therethrough; and
  a bearing supporting the rotational shaft,
  wherein the sensor circuit board includes
    a through-hole through which the rotational shaft extends, having a smaller diameter than the bearing, and having a periphery at which the rotation detecting element is arranged, and
    an opening radially extending from the through-hole and larger than a diameter of the rotational shaft.

A seventh aspect of the present disclosure provides a method of assembling a brushless motor, the method including:

mounting a rotor having a rotational shaft and a bearing to a stator;

placing the bearing and the rotational shaft through an interference avoidance hole in a sensor circuit board having a rotation detecting element;

positioning the rotational shaft at a through-hole continuous with the interference avoidance hole and having a smaller diameter than the interference avoidance hole and the bearing; and mounting the sensor circuit board to the stator.

An eighth aspect of the present disclosure provides a method of assembling a brushless motor, the method including:

mounting a rotor having a rotational shaft and a bearing to a stator;

placing the bearing and the rotational shaft through a hole in a sensor circuit board having a rotation detecting element, the hole having a radius R greater than a distance D from a center of the rotational shaft to the rotation detecting element;

positioning the rotational shaft at a through-hole continuous with the hole and having a smaller diameter than the hole and the bearing; and mounting the sensor circuit board to the stator.

A ninth aspect of the present disclosure provides a method of assembling a brushless motor, the method including:

mounting a rotor having a rotational shaft and a bearing to a stator;

placing the rotational shaft through an opening in a sensor circuit board having a rotation detecting element, and having a smaller diameter than the bearing;

positioning the rotational shaft at a through-hole continuous with the opening and having a smaller diameter than the bearing; and mounting the sensor circuit board to the stator.

The above aspects of the present invention improve the durability of a power tool including a brushless motor having a sensor circuit board.

BRIEF DESCRIPTION OF DRAWINGS

FIG. 5A is a perspective view of the sensor circuit board to be mounted, and FIG. 5B is a side view of the sensor circuit board to be mounted.

FIG. 6A is a perspective view of the sensor circuit board to be positioned, FIG. 6B is a side view of the sensor circuit board to be positioned, and FIG. 6C is a front view of the sensor circuit board to be positioned.

FIG. 7A is a perspective view of the sensor circuit board after positioned, FIG. 7B is a side view of the sensor circuit board after positioned, and FIG. 7C is a front view of the sensor circuit board after positioned.

FIG. 8A is a front view of a modified sensor circuit board to be mounted, and FIG. 8B is a perspective view of the modified sensor circuit board to be mounted.

FIG. 9A is a front view of the modified sensor circuit board after positioned, and FIG. 9B is a perspective view of the modified sensor circuit board after positioned.

DETAILED DESCRIPTION

A power tool according to an embodiment will now be described with reference to the drawings.

Figure 1:
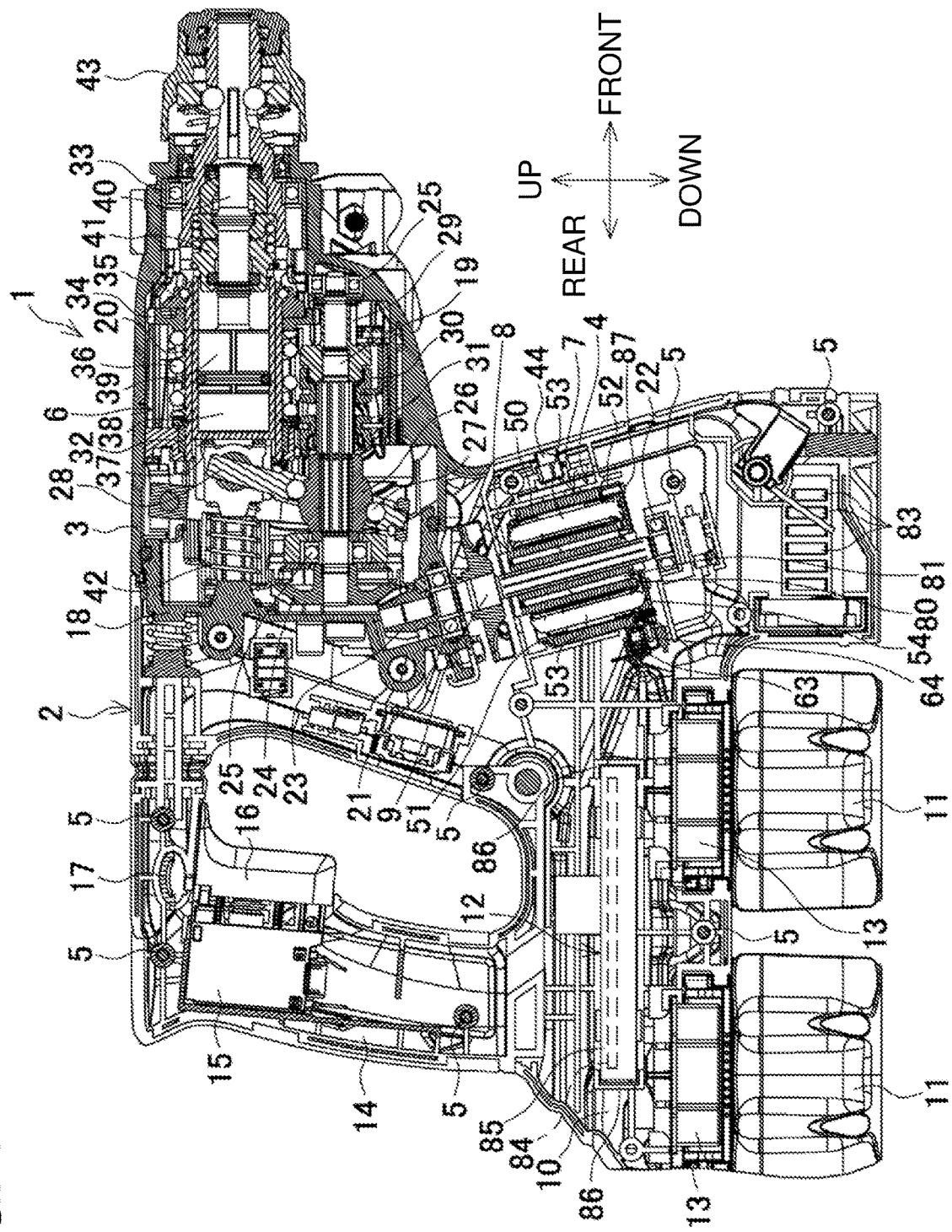
FIG. 1 is a longitudinal sectional view taken along the centerline of a hammer drill.

FIG. 1 is a longitudinal sectional view of a hammer drill, which is an example of a power tool. The hammer drill 1 includes a body housing 2 and a front housing 3. The body housing 2 contains a brushless motor 4 and other parts, and is assembled by fastening a pair of right and left halves of the housing with multiple screws 5. The front housing 3 is a tapered cylindrical casing for containing an output unit 6, and is fastened to the upper front of the body housing 2 with screws (not shown) from the front.

The brushless motor 4 is an inner-rotor motor including a cylindrical stator 7 and a rotor 8 extending through the stator 7, and is held with a rotational shaft 9 of the rotor 8 tilted upward and obliquely backward. The body housing 2 has a battery mount 10 behind the brushless motor 4. The battery mount 10 holds two battery packs 11 that serve as a power supply. The battery mount 10 contains a controller 12 extending horizontally in the figure and terminal mounts 13 for electrically connecting the battery packs 11 under the controller 12. Above the battery mount 10, a handle 14 extends vertically in the figure. The handle 14 contains a switch 15 with a trigger 16 protruding frontward, and a forward/reverse switching lever 17 for the motor.

The output unit 6 is contained in a front space of an inner housing 18 located in an internal rear space of the front housing 3. The output unit 6 includes a countershaft 19 extending horizontally, and a cylindrical tool holder 20 extending horizontally above the countershaft 19. The rotational shaft 9 of the brushless motor 4 is supported by an upper bearing 21 mounted on the inner housing 18 and a lower bearing 22 mounted on the body housing 2. The upper end of the rotational shaft 9 protrudes into the front housing 3, and a first gear 23 at the upper end meshes with a second gear 24 at the rear of the countershaft 19. The countershaft 19 has its rear end pivotally supported on the inner housing 18 and its front end pivotally supported on the front inner surface of the front housing 3 with bearings 25.

The countershaft 19 has a boss sleeve 26 in front of the second gear 24 and a third gear 29 in front of the boss sleeve 26. The boss sleeve 26 and the third gear 29 are mounted on the countershaft 19 in a rotatable manner. The boss sleeve 26 externally holds an arm 28 with a swash bearing 27 having its axis tilted. The countershaft 19 has a pair of front and rear clutches 30 and 31 splined to the shaft between the boss sleeve 26 and the third gear 29. The front housing 3 has a switch lever (not shown) on its side surface, which is operable to switch the slide positions of the clutches 30 and 31 between the position at which only the rear clutch 31 engages with the boss sleeve 26, the position at which only the front clutch 30 engages with the third gear 29, and the position at which the clutch 31 engages with the boss sleeve 26 and the clutch 30 engages with the third gear 29.

In a front area of the inner housing 18, the tool holder 20 is pivotally supported by a bearing 32 mounted on an intermediate part of the front housing 3 and a bearing 33 mounted on the front end of the front housing 3. The tool holder 20 causes an intermediate fourth gear 34 to mesh with the third gear 29 on the countershaft 19. When the fourth gear 34 with its front engaged in the rotational direction with a receiving ring 35 fixed on the tool holder 20 is pressed by a coil spring 36 from the rear, the fourth gear 34 is integrated with the tool holder 20 in the rotational direction. This structure forms a torque limiter in which an increase in torque exerted on the tool holder 20 causes the fourth gear 34 to retreat from the receiving ring 35 against the biasing force from the coil spring 36 and to be disconnected from the tool holder 20.

The rear space of the tool holder 20 contains a reciprocating piston cylinder 37 having its rear end connected to the arm 28. The piston cylinder 37 contains a striker 39, which can reciprocate through an air chamber 38. The tool holder 20 has an intermediate portion 40, which is arranged in front of the striker 39 and abuts against a tip tool (not shown), such as a drill bit, mounted on the tip. The intermediate portion 40 has a surrounding holding member 41, which holds the intermediate portion 40 without any tip tool at an advanced position to prevent unintended strikes caused by the striker 39. The inner housing 18 and the piston cylinder 37 have a coil spring 42 between them. In a drill mode, the coil spring 42 biases the piston cylinder 37 at an advanced position to prevent unnecessary strikes. An operation sleeve 43 allows a tip tool to be attached to and removed from the tool holder 20. The body housing 2 has a light (light emitting diode, or LED) 44 in front of the brushless motor 4. The LED 44 faces frontward and obliquely upward, and illuminates in front of the tip tool.

Figure 2:
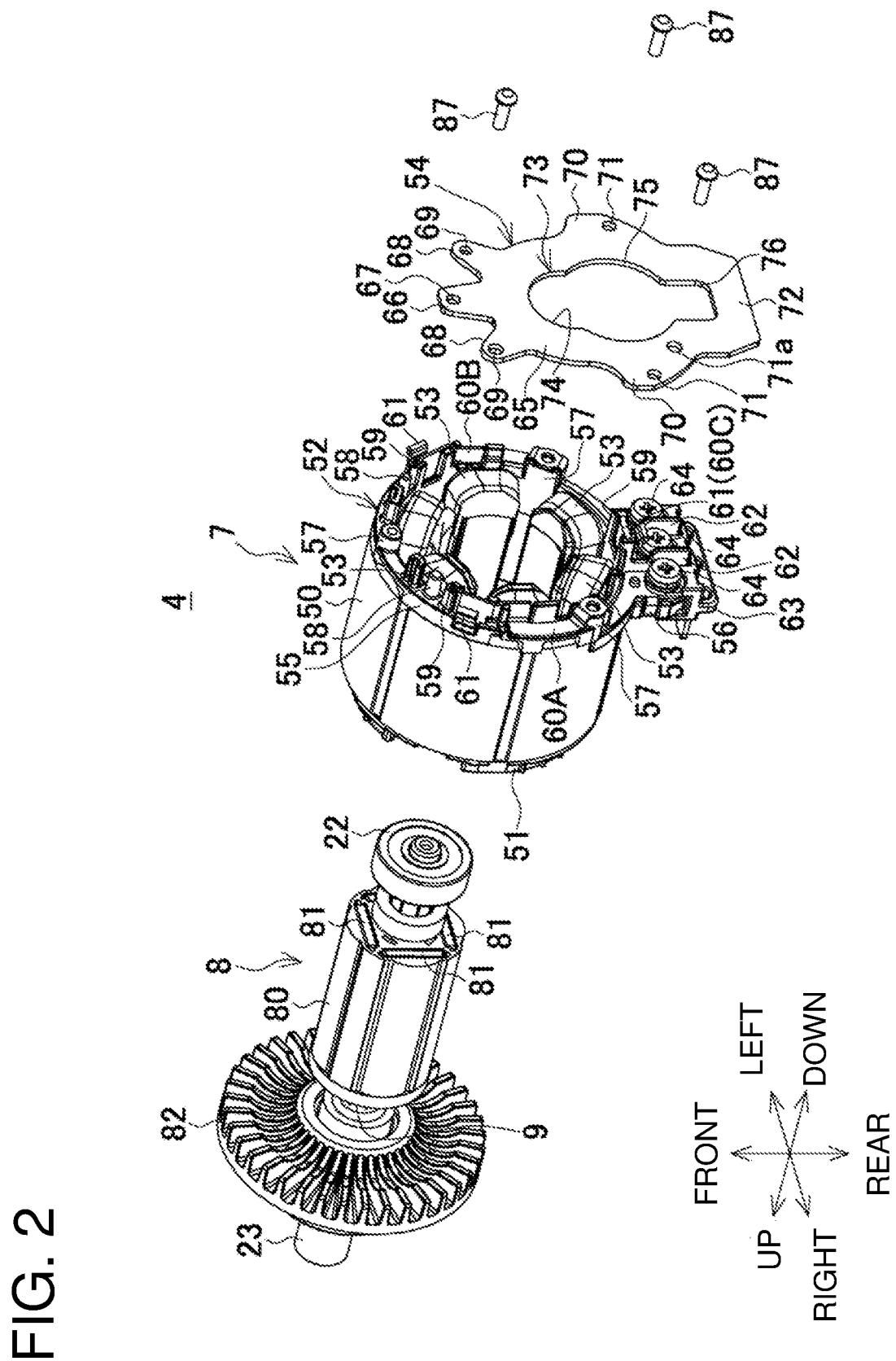
FIG. 2 is an exploded perspective view of a brushless motor.
Figure 3:
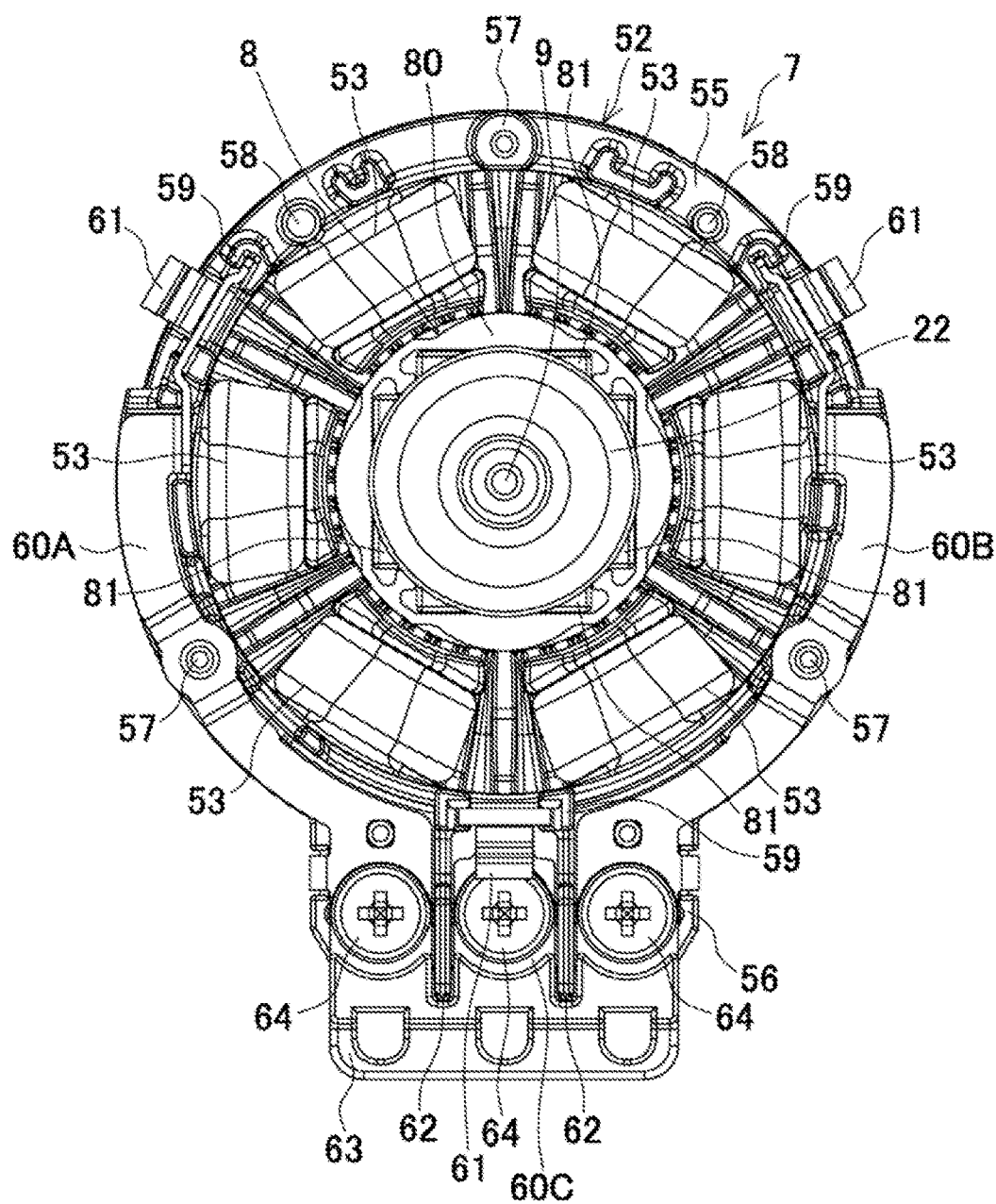
FIG. 3 is a front view of a stator.

As shown in FIGS. 2 and 3, the stator 7 in the brushless motor 4 includes a cylindrical stator core 50, an upper insulator 51 and a lower insulator 52, and six coils 53. The cylindrical stator core 50 is a multilayered steel plate. The upper insulator 51 is arranged on the axially upper end surface of the stator core 50, and the lower insulator 52 is arranged on the axially lower end surface of the stator core 50. The coils 53 are wound inside the stator core 50 through the upper and lower insulators 51 and 52. The lower insulator 52 holds a sensor circuit board 54 described later.

The lower insulator 52 has a resin ring 55 and a connector 56. The ring 55 and the stator core 50 have substantially the same outer diameter. The connector 56 radially protrudes from the ring 55 toward the controller 12. The ring 55 has three screw bosses 57 protruding from its bottom surface and spaced circumferentially at equal intervals. The screw bosses 57 are used to screw the sensor circuit board 54 to the ring. The screw bosses 57 have two protruding positioning bosses 58 and three protruding holders 59 between them. The positioning bosses 58 position the sensor circuit board 54. The holders 59 hold clamped portions 61 of fuse terminals 60A to 60C described below.

The lower insulator 52 has the three fuse terminals 60A to 60C on its bottom surface for connecting the three-phase coils 53 with leads, which serve as power supply lines. The right and left fuse terminals 60A and 60B each have a clamped portion 61 at their one end, and each have their other end extending along the external right or left sides of the connector 56 at its bottom and are bent and fixed on the connector 56. Each clamped portion 61 is a metal strip curved along the ring 55 and held by the front right or left holder 59. The central fuse terminal 60C has a clamped portion 61 to be fused with a wire held inside at its one end, and has its other end bent and fixed on the connector 56. This clamped portion 61 is also a metal strip and held by the rear central holder 59, and extends along the center of the connector 56 at its bottom.

The connector 56 has protruding separation ribs 62 between the fuse terminals 60A to 60C on its bottom surface. The areas divided by the separation ribs 62 have embedded nuts (not shown) corresponding to the fuse terminals 60A to 60C. Leads from the controller 12 corresponding to the fuse terminals 60A to 60C are soldered to a terminal unit 63, which is squared U-shaped as viewed from the side. The terminal unit 63 is mounted to clamp the connector 56 from the rear. The terminal unit 63 and the connector 56 are coupled by screwing screws 64 in the nuts through the fuse terminals 60A to 60C to achieve an electrical connection.

The sensor circuit board 54 extends ovally from the inside of the ring 55 to the connector 56 horizontally. The sensor circuit board 54 has a circular portion 65 adjacent to its front end and sized slightly smaller than the ring 55. The sensor circuit board 54 has a screw stop tab 66 and two positioning tabs 68 radially on its periphery. The screw stop tab 66 has a through-hole 67 corresponding to the front central screw boss 57. The positioning tabs 68 have small through-holes 69 corresponding to the right and left positioning bosses 58. The sensor circuit board 54 includes central right and left extensions 70 having through-holes 71 corresponding to the right and left screw bosses 57. The sensor circuit board 54 has a trapezoidal portion 72 at its rear end. The trapezoidal portion 72 extends rearward under the connector 56. A small through-hole 71a is used to determine the right or left orientation.

The sensor circuit board 54 has a long hole 73 extending longitudinally in its center. The long hole 73 includes a through-opening 74, an interference avoidance opening 75 (widened opening 75), and a square opening 76, which are continuous with one another. The through-opening 74 is circular and concentric with the circular portion 65. The rotational shaft 9 of the rotor 8 can extend through the through-opening 74. The through-opening 74 has a smaller diameter than the lower bearing 22 on the rotational shaft 9. The interference avoidance opening 75 continuous with the rear of the through-opening 74 is circular and has a larger diameter than the bearing 22. The square opening 76 continuous with the rear of the interference avoidance opening 75 is quadrangular and narrower than the interference avoidance opening 75.

Figure 4A:
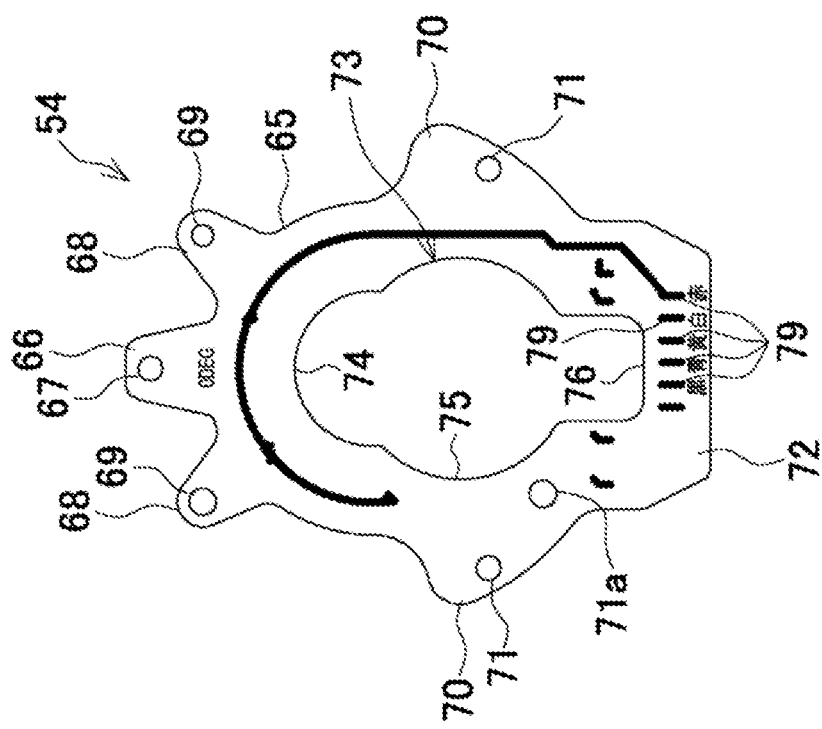
FIG. 4A is a top view of a sensor circuit board (adjacent to a lower insulator)
Figure 4B:
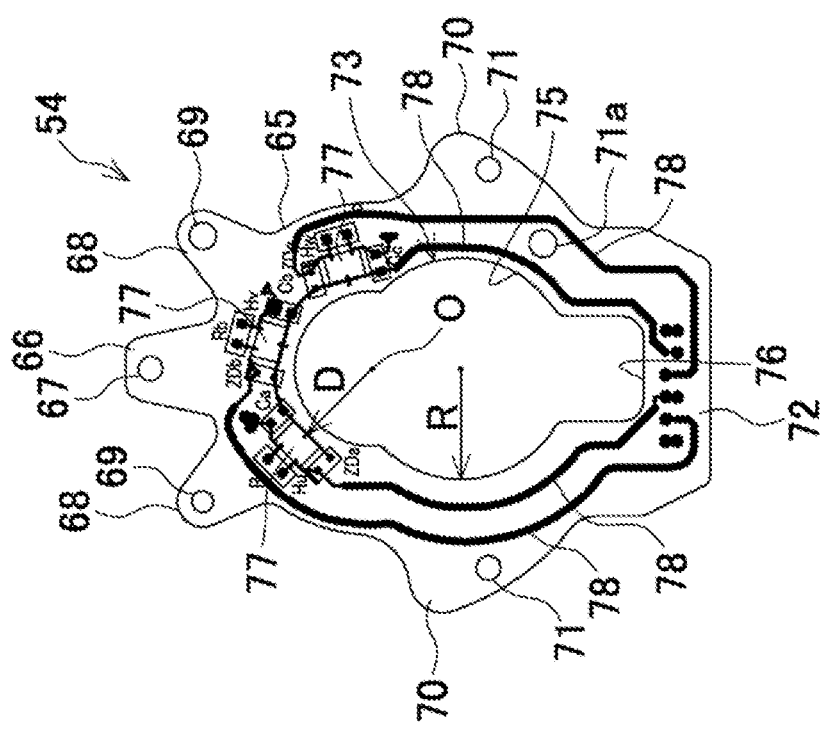
FIG. 4B is a bottom view of the sensor circuit board.

As shown in FIG. 4A, the sensor circuit board 54 has, on its upper surface (surface adjacent to the lower insulator 52), three magnetic sensors 77 mounted concentrically on the periphery of the through-opening 74. The magnetic sensors 77 are, for example, Hall elements, and detect the positions of permanent magnets 81 included in the rotor 8 to output a rotation detection signal. The sensor circuit board 54 has, on its two sides, conductive patterns 78 outside the long hole 73 from the circular portion 65 to the trapezoidal portion 72. The conductive patterns 78 connect the three magnetic sensors 77 in parallel. As shown in FIG. 4B, the trapezoidal portion 72 has connections 79 on the lower surface of the sensor circuit board 54 for linking with each conductive pattern 78 and connecting to five leads. The two connections 79 at both ends are used for the power supply, and the three connections 79 between them are for signal output. As shown in FIG. 4A, the interference avoidance opening 75 has a radius R greater than the radial distance D from the center O of the through-opening 74, which is the center of the rotational shaft 9 extending through the through-opening 74, to the magnetic sensors 77.

The rotor 8 includes the rotational shaft 9 aligned with its axis, a substantially cylindrical rotor core 80, and four plate-like permanent magnets 81. The rotor core 80 is formed from a multilayered steel plate, and surrounds the rotational shaft 9. The permanent magnets 81 are fixed inside the rotor core 80. The rotational shaft 9 has a centrifugal fan 82 between the stator 7 and the upper bearing 21. The body housing 2 has multiple air outlets (not shown) outside the centrifugal fan 82. Below the brushless motor 4, the body housing 2 has multiple inlets 83 (FIG. 1) arranged in a horizontal line on its side surface. The inlets 83 are also formed outside the controller 12.

The controller 12 includes a control circuit board 84 contained in a resin case 85, which is a flat rectangular box. The control circuit board 84 has components mounted on it, including a microcomputer, a capacitor, and switching elements for controlling electric conduction to the coils 53 included in the stator 7. The controller 12 is held horizontally by U-shaped holding ribs 86 protruding inside the body housing 2 above the terminal mounts 13.

To assemble the brushless motor 4, as shown in FIGS. 5A and 5B, the rotor 8 with the bearings 21 and 22 and the centrifugal fan 82 is placed through the stator 7 by first inserting the bearing 22 into the stator 7 through the upper insulator 51 and then the sensor circuit board 54 is attached to the stator 7.

As shown in FIGS. 6A to 6C, the rotational shaft 9 is then placed through the interference avoidance opening 75 with the lower insulator 52 facing the surface of the sensor circuit board 54 having the magnetic sensors 77. The interference avoidance opening 75 has a larger diameter than the bearing 22, and the rotational shaft 9 with the bearing 22 can pass through the interference avoidance opening 75.

As shown in FIGS. 7A to 7C, the sensor circuit board 54 is then slid toward the connector 56. The through-holes 67 and 71 are aligned with the corresponding screw bosses 57, and the positioning bosses 58 are fit in the corresponding small through-holes 69. The rotational shaft 9 is thus relatively moved to be concentric with the through-opening 74, and the sensor circuit board 54 is attached in position. In this state, the holder 59 adjacent to the connector 56, and the clamped portion 61 of the fuse terminal 60C protrude into the square opening 76, and thus do not interfere with the sensor circuit board 54.

Finally, the screw stop tab 66 and the extensions 70 are fixed to the corresponding screw bosses 57 with screws 87 (FIG. 2) to complete the assembly of the brushless motor 4, which can be mounted in the body housing 2.

In the brushless motor 4 according to the present embodiment with the bearing 22 having a larger diameter than the through-opening 74, as shown in FIG. 4A, the radius of the interference avoidance opening 75, through which the bearing 22 passes, is greater than the radial distance D from the center O of the rotational shaft 9 extending through the through-opening 74, to the magnetic sensors 77. The bearing 22 with this large diameter overlaps the magnetic sensors 77 outside the through-opening 74 in the axial direction of the rotational shaft 9 as shown in FIG. 7C.

In the hammer drill 1 according to the present embodiment, when the trigger 16 is pressed to turn on the switch 15, the control circuit board 84 in the controller 12 supplies the brushless motor 4 with power from the battery packs 11 to drive the brushless motor 4. More specifically, the microcomputer in the control circuit board 84 receives a rotation detection signal indicating the positions of the permanent magnets 81 output from the magnetic sensors 77 to determine the rotational state of the rotor 8. The microcomputer controls the on-off state of each switching element in accordance with the determined rotational state, and passes current through the coils 53 sequentially to rotate the rotor 8. The rotation of the rotational shaft 9 causes the countershaft 19 to rotate with the first gear 23 and the second gear 24.

With only the rear clutch 31 engaged with the boss sleeve 26, the rotation of the countershaft 19 is transmitted to the boss sleeve 26 and transformed into back-and-forth swinging of the arm 28 with the swash bearing 27. Thus, the piston cylinder 37 reciprocates together with the arm 28, and causes the striker 39 to operate in a synchronized manner through the air chamber 38. This is a hammer mode in which strikes are transmitted to the tip tool through the intermediate portion 40.

With only the front clutch 30 engaged with the third gear 29, the rotation of the countershaft 19 is transmitted to the third gear 29 to rotate the tool holder 20 with the fourth gear 34. This is a drill mode in which the tip tool rotates together with the tool holder 20.

With both the clutches 30 and 31 engaged with the boss sleeve 26 and the third gear 29, strikes and rotation are transmitted to the tip tool. This is a hammer-drill mode.

When the centrifugal fan 82 rotates in accordance with the rotation of the rotational shaft 9, the inlets 83 below the brushless motor 4 and the inlets outside the controller 12 draw outside air. The airflow from the inlets 83 rises within the body housing 2, passes through the stator 7 and the rotor 8 to cool the brushless motor 4, and then exits through the air outlets. The airflow from the inlets adjacent to the controller 12 passes through the controller 12 and flows frontward along the case 85 to cool the switching elements and other components on the control circuit board 84. The airflow then meets the airflow from the inlets adjacent to the brushless motor 4 and exits through the air outlets.

The sensor circuit board 54 includes the circular portion 65 with a smaller diameter than the ring 55 in the lower insulator 52, and also has the large long hole 73 at the center. Thus, the airflow through the lower insulator 52 passes inside and outside the sensor circuit board 54 and through the stator 7 and the rotor 8 smoothly to effectively cool the sensor circuit board 54 elongated horizontally.

In the hammer drill 1 according to the present embodiment, the bearing 22 on the rotational shaft 9 overlaps the magnetic sensors 77 on the sensor circuit board 54 in the axial direction of the rotational shaft 9. Thus, the bearing 22 on the rotational shaft 9 may have a large diameter in the brushless motor 4 having the sensor circuit board 54. This extends the life of the bearing 22 and improves its durability.

More specifically, the sensor circuit board 54 includes the through-opening 74 through which the rotational shaft 9 extends and having the periphery on which the magnetic sensors 77 are arranged, and the interference avoidance opening 75 having a larger diameter than the through-opening 74, continuous with the through-opening 74, and allowing the bearing 22 to be placed through it. The bearing 22 is fixed to the stator 7 to overlap the through-opening 74 and the magnetic sensors 77. Thus, the rotational shaft 9, and the bearing 22 having a larger diameter than the through-opening 74 can pass through the interference avoidance opening 75. The through-opening 74 is maintained, thus allowing the magnetic sensors 77 to be placed in position for detection.

The radius R of the interference avoidance opening 75 is greater than the radial distance D from the center of the rotational shaft 9 to the magnetic sensors 77. The bearing 22 can thus have a diameter that allows for a longer life.

The shape of the long hole in the sensor circuit board, and the shapes and sizes of the through-opening and the interference avoidance opening in the sensor circuit board are not limited to the examples described in the above embodiment. For example, the through-opening may have a smaller diameter, and the interference avoidance opening may be quadrangle or polygonal. The square opening may be eliminated unless the board interferes with the fuse terminals. The number of screw stop tabs, positioning tabs, and extensions and their locations may also be changed in accordance with the insulator, or the positioning tabs may be eliminated.

In the present embodiment, the interference avoidance opening is continuous with the through-opening in the sensor circuit board and has a larger diameter than the bearing to avoid interference with the bearing. However, any other structure may be used. For example, a sensor circuit board 54A shown in FIGS. 8A and 8B according to a modification has, at the center of a circular portion 65, a concentric circular through-hole 90 with a smaller diameter than the bearing 22 and magnetic sensors 77 at its periphery. Additionally, the circular portion 65 has a circumferential cutout 91 through which the rotational shaft 9 can pass radially. More specifically, the cutout 91 radially extends from the through-hole 90. The cutout 91 has a dimension (width) greater than the diameter of the rotational shaft 9. The angle formed by the circular portion 65 about the rotational shaft 9 is 180 degrees or more. More specifically, the angle formed by the cutout 91 extending from the through-hole 90 is 180 degrees or less. As shown in FIG. 8A, the cutout 91 is formed to have an angle α of 180 degrees or more, and a screw stop tab 66 and extensions 70 to be fixing portions for the stator 7 are formed in the sensor circuit board 54A. In this modification, no interference avoidance opening is formed, and a square opening 92 is discontinuous from the through-hole 90.

To assemble the brushless motor 4 according to the modification, as shown in FIGS. 8A and 8B, the rotor 8 with the bearings 21 and 22 and the centrifugal fan 82 is placed through the stator 7 by first inserting the bearing 22 through the upper insulator 51, and then the sensor circuit board 54A is attached to the stator 7.

As shown in FIGS. 9A and 9B, the rotational shaft 9 above the bearing 22 is then inserted in the cutout 91 with the lower insulator 52 facing the surface of the sensor circuit board 54A having the magnetic sensors 77, and the sensor circuit board 54A is slid in the radial direction of the cutout 91. This causes the rotational shaft 9 to move relatively within the cutout 91 toward the through-hole 90. When the through-holes 67 and 71 are aligned with the corresponding screw bosses 57, and the positioning bosses 58 are fit in the corresponding small through-holes 69, the sensor circuit board 54A is placed in position.

Finally, the screw stop tab 66 and the extensions 70 are fixed to the corresponding screw bosses 57 with the screws 87 to complete the assembly of the brushless motor 4, which can be mounted in the body housing 2. The bearing 22 in the modification also has a larger diameter than the through-hole 90. As shown in FIG. 9A, the bearing 22 with the large diameter overlaps the magnetic sensors 77 on the periphery of the through-hole 90 in the axial direction of the rotational shaft 9.

The sensor circuit board 54A in the modification has an angle of 180 degrees or more about the rotational shaft 9, defining the circumferential cutout 91 through which the rotational shaft 9 radially passes. The rotational shaft 9 supported by the bearing 22 having a larger diameter than the through-hole 90 can pass through the cutout 91. The screw stop tab 66 and the extensions 70 to be fixed to the stator 7 are formed in the area corresponding to the angle of 180 degrees or more about the rotational shaft 9. This structure allows the sensor circuit board 54A to be firmly fixed to the stator 7, although the cutout 91 is formed.

The remaining angle in the sensor circuit board after the opening is formed may be smaller than the angle in the example shown in FIGS. 8A and 8B, but is 180 degrees or more.

Additionally, the present invention is applicable not only to a hammer drill but also to any other power tool that includes a brushless motor as a driving source, such as an electric hammer, a driver drill, an impact driver, and a circular saw. The invention is also applicable to an AC machine with no battery pack.

REFERENCE SIGNS LIST 1 hammer drill
2 body housing
3 front housing
4 brushless motor
6 output
7 stator
8 rotor
9 rotational shaft
12 controller
19 countershaft
20 tool holder
21, 22, 32, 33 bearing
37 piston cylinder
39 striker
50 stator core
51 upper insulator
52 lower insulator
53 coil
54, 54A sensor circuit board
55 ring
56 connector
57 screw boss
60A to 60C fuse terminal
65 circular portion
66 screw stop tab (fixing portion)
67, 71 through-hole
68 positioning tab
70 extension (fixing portion)
73 long hole
74 through-opening (through-hole)
75 interference avoidance opening (interference avoidance hole, or hole)
76 square opening
77 magnetic sensor (rotation detecting element)
78 conductive pattern
80 rotor core
84 control circuit board
87 screw
90 through-hole
91 opening

What is claimed is:
1. A power tool, comprising:
a housing;
a brushless motor including
 a rotor having a rotational shaft,
 a stator, and
 a sensor circuit board fixed to the stator and having a rotation detecting element configured to detect rotation of the rotor, and receiving the rotational shaft therethrough; and
a bearing held in the housing and supporting the rotational shaft, the bearing being located to overlap the rotation detecting element in an axial direction of the rotational shaft, wherein
the sensor circuit board includes
a through-hole through which the rotational shaft extends and having a periphery at which the rotation detecting element is located, and an interference avoidance hole continuous with the through-hole, configured to receive the bearing therethrough, and having a larger diameter than the through-hole.

2. The power tool according to claim 1, wherein the interference avoidance hole has a radius R greater than a radial distance D from a center of the rotational shaft to the rotation detecting element.

3. The power tool according to claim 1, wherein a plurality of the rotation detecting elements are concentrically arranged on the periphery of the through-hole.

4. The power tool according to claim 2, wherein a plurality of the rotation detecting elements are concentrically arranged on the periphery of the through-hole.

5. The power tool according to claim 1, wherein the sensor circuit board further includes
a conductive pattern connected to the rotation detecting element, and
a lead connection connected to the conductive pattern.

6. The power tool according to claim 2, wherein the sensor circuit board further includes
a conductive pattern connected to the rotation detecting element, and
a lead connection connected to the conductive pattern.

7. The power tool according to claim 3, wherein the sensor circuit board further includes
a conductive pattern connected to the rotation detecting element, and
a lead connection connected to the conductive pattern.

8. The power tool according to claim 1, wherein the bearing is held in the housing to overlap the through-hole and the rotation detecting element.

9. The power tool according to claim 2, wherein the bearing is held in the housing to overlap the through-hole and the rotation detecting element.

10. The power tool according to claim 3, wherein the bearing is held in the housing to overlap the through-hole and the rotation detecting element.

* * * * *